April 24, 1951  H. W. HART  2,550,149
ILLUMINATION DUPLICATION FOR PHOTOGRAPHY
Filed Sept. 14, 1946  2 Sheets-Sheet 1
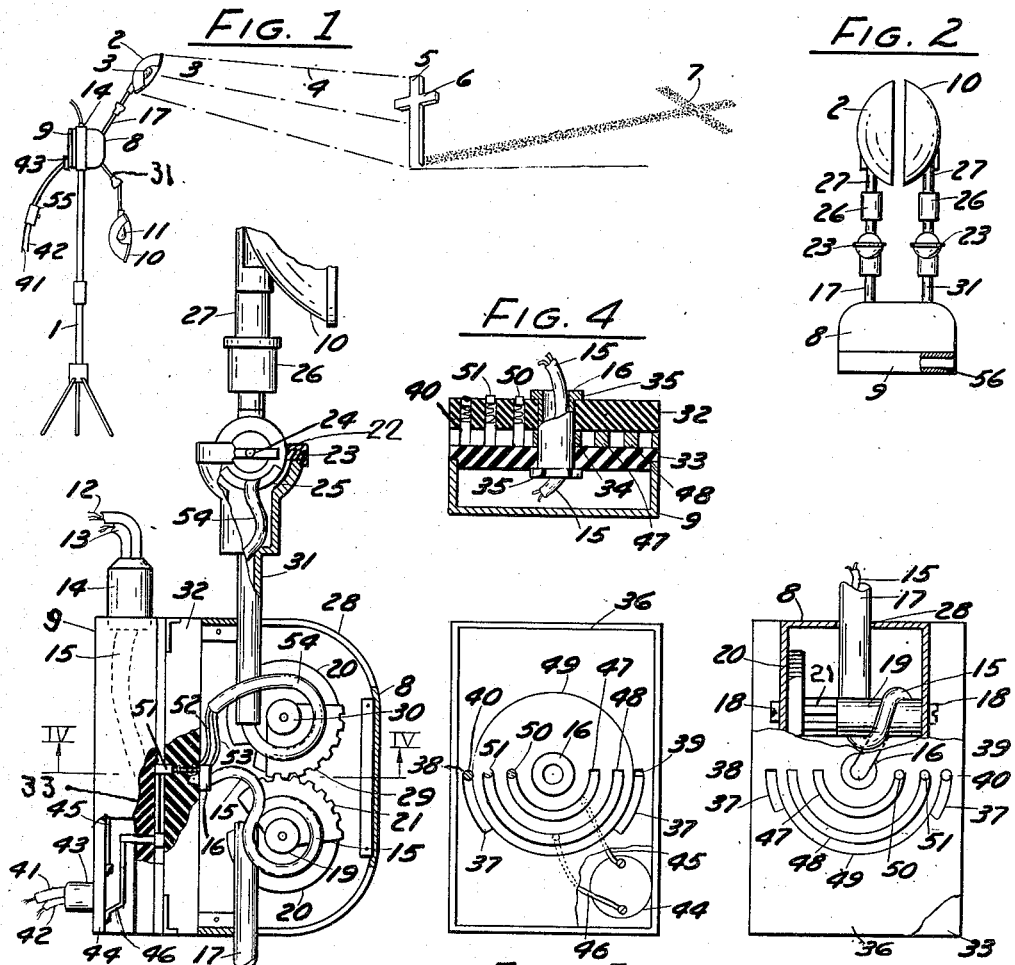
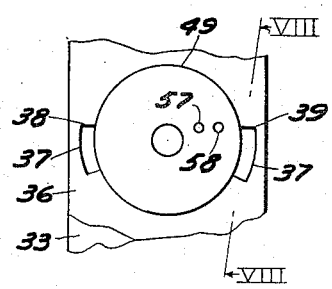
Halten W. Hart, Inventor Patented Apr. 24, 1951

2,550,149

UNITED STATES PATENT OFFICE 2,550,149

ILLUMINATION DUPLICATION FOR PHOTOGRAPHY

Halten W. Hart, Toledo, Ohio

Application September 14, 1946, Serial No. 696,984

2 Claims. (Cl. 240—1.3)

1

This invention relates to duplicating special light effects by artificial illumination.

This invention has utility when incorporated for checking desired shadow relations in photographic work, and manipulating to reproduce such relations upon flashlight exposure. To this end as a photographer's aid, a light source is established with a location to bring out details sought for the particular picture to be taken. With the camera having been placed, and the exposure control therefor set, then the operator swings the unit herein to displace the finder light as theretofore used by a flash light source. Forthwith setting off the flash in synchronism with the exposure, and the film has made a record of the predetermined highlight and shadow regions therefor.

Referring to the drawings:

Fig. 1 is a perspective view of an embodiment of the invention as in-use;

Fig. 2 is a side elevation of the unit of Fig. 1, disconnected and in collapsed or non-use position therefor;

Fig. 3 is a view, with parts broken away, showing features of the wiring to the dual arm turntable structure;

Fig. 4 is a partial section on the line IV—IV, Fig. 3, showing the turntable pivot;

Fig. 5 is a plan view of the base for the turntable of Fig. 4, a portion being broken away to show wiring features thereto;

Fig. 6 is a view looking down on the turntable of Fig. 5, with some of the over parts shown and such at the swing position or 180° counterclockwise from Fig. 5;

Fig. 7 is a fragmentary view of the turntable of Fig. 5, but with spot, in lieu of slide contacts for the flashlight circuit connection;

Fig. 8 is a section on the line VIII—VIII, Fig. 7, showing the limit stop cam for the turntable;

Figure 9:
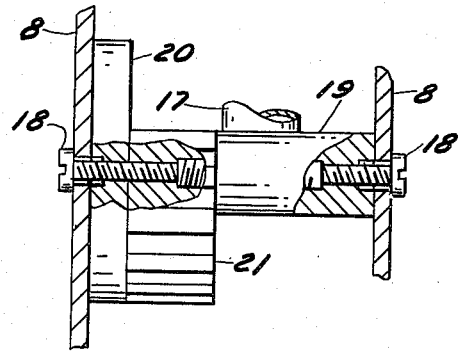
Fig. 9 is a partially broken away side view in an enlarged scale of one of the gear segment carrying shafts; showing the screw mounting thereof in the housing.
Figure 10:
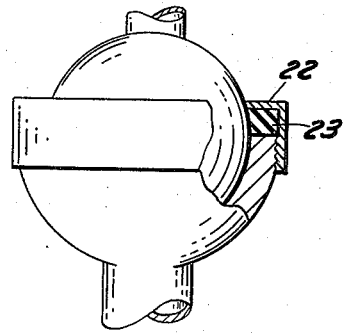
Fig. 10 is a fragmentary enlarged view showing the compressible friction member at the hinge joint of the light carrying arm.
Figure 11:
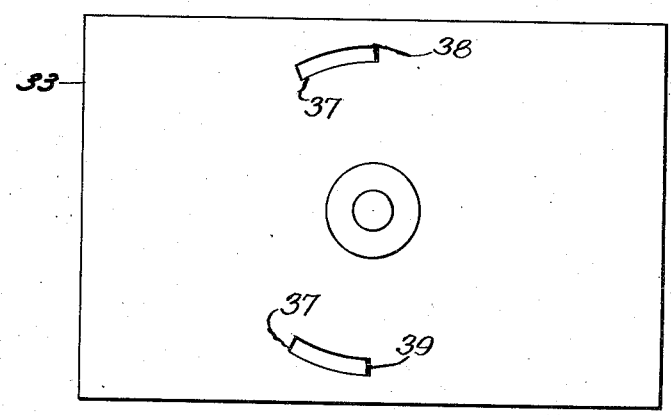
Fig. 11 is a plan view of one of the companion blocks of the turntable, on a larger scale than the showing in Fig. 6, and with omission of parts upward therefrom.
Figure 12:
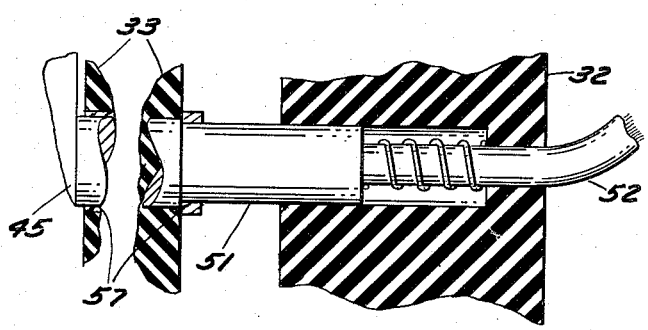
Fig. 12 is an enlarged view of a spring thrown contact pin over the view in Fig. 3, with the contact at a terminal 57 of Fig. 7.

Upon an adjustable tripod 1 there may be lo-

2 cated a light ray projecting reflector 2 for directing from a light source 3, as an incandescent bulb, light rays 4 toward an object 5 to bring about the desired placement and intensity for high light region 6 and shadow of darkened region 7. When such be determined upon, and the camera placed, the housing 8 is swung downward clockwise on its base 9, fixed with the support or tripod 1, from its definite position locating the light source 3, to an out-of-use or down position therefor. In this orienting, a light ray projecting similar reflector 10, is brought to the finding position which had been occupied by the reflector 2. A flashlight bulb 11 therein may be set off. The result is that the identical studied highlights and shadows found by the time exposure light 3, are duplicated for the sensitized film of the camera to record.

A normal electric lighting circuit lines 12, 13, to a fitting 14 at the base 9, provide electric current supply to a flexible insulated conductor pair 15, extending thru hollow turntable pivot 16 into the housing 8, and thence by hollow arm conduit 17 to the bulb 3. Parallel side walls of the housing 8 have aligned screws 18 (Fig. 6) therethru mounting a shaft 19 having fixed thereon a friction disk 20 and a sector gear 21. The setting of the screws 18 may adjust the frictional holding exerted thru the housing upon the gear 21 parallel to a tangent from which the conduit 17 extends and is fixed with the gear. Adjustable clamping means 22 (Fig. 3) hold a friction member 23 at a hinge joint 24 limited to rock on an axis parallel to the axis of the shaft 19. There is clearance 25 thru the ball of the hinge joint 24 for the electrical conductor to a lighting fixture socket 26 and an adapter fitting 27 carrying the reflector 2. The conduit arm 17 may swing approximately 90° on the shaft 19 as an axis. In this movement, it rides in a slot or way 28 in the housing 8.

The gear sector 21 is in mesh with a complementary gear sector 29 on a shaft 30 mounted similarly to and in parallel with the shaft 19. Fixed with the gear 29 is a conduit 31 identically oppositely extending to the conduit 17. The conduit 31 thru its hinge joint friction unit 22, 23, 24, 25, socket 26 and adapter 27 mounts the reflector 11 for similar joint setting as adopted for the companion arm 17. It follows that any rocking movement imparted to the arm 17 as to its housing mounting 8 for swinging on the shaft 19, brings about the same swing movement in the same plane for the arm 31.

The housing 8 has a back or fixed therewith a turntable insulation section or block 32 parallel to a somewhat similar insulation block 33 of the base 9. A spacing washer 34 between the plates or blocks 32, 33, and about the tube 13, provides the assembly at the turntable axis. Nuts 35 on the tube 16 hold the grouping together. On the block 33 is a thin metal wear plate 36 having depression ways or cams 37 to limit stops 38, 39, a full half diameter or 180° apart. A spring depressed plunger pin 40 carried by the block 32 an appropriate radial distance from the axis tube 16, rides over the ways 37 into the stop 38 at clockwise turning of the housing 8 on the base 9 to swing the reflector 2 down out of or away from upward view checking position. At this stop position from the shifting of the reflector 2, the duplicate reflector 11 comes to the identical position just vacated by the reflector 2.

Drycells or a special different or low voltage electric current supply by lines 41, 42, may be attached to fitting 43 providing a detachable connection to the base 9, swingably mounted on a vertical axis of the tripod 1. The fitting 43 electrically connects to a fitting 44 in the base 9 from which extends conductor lines 45, 46, respectively to arc terminals 47, 48, in central area 49 opening in the plate 36 exposing the insulation block 33. The terminals 47, 48, are concentric with the turntable pivot 16, and have riding thereon spring thrown contact pins 50, 51, extending thru the block 32. The contacts 50, 51, have terminals to lines 52, 53, in conductor 54.

When the finder arm 17 has had its light source 3 displaced by the limit swinging of the housing 8 on its turntable connection with the base 9, the flashlight 11 is in the identical projection location for sending out light rays which had been used by the finder projector 2. The operator may then snap a switch 55 in the lines 41, 42, with the instant illumination result for camera sensitized film exposure.

The stem for the tripod 1 enters a socket 56 (Fig. 2) in the base 9. Accordingly, as the tripod 1 is set, the base 9 may be slipped thereon at the tripod stem top and the unit turned on such tripod stem as an axis, in generally directing the unit toward the region for light exposure to be undertaken. The stop positions 38, 39, for the turntable locate the housing 8 in register for one arm slot guide opening 28 to be up or in the direction of the tripod stem extent, and the other opening 28 down or opposite thereto. The axis of the turntable, determined by the pivot sleeve 16, intersects the axis at the joint 1, 56. With the axis 16 horizontal, the axes of the parallel shafts 19, 30, in the housing 8 extend transversely to the axis 16. These three sets of axes are thus so assembled that in the normal operation thereof they locate swinging or turning in three planes at 90° relationship therebetween. The screws 18 may so adjust the friction disk 20 that the dual arms 17, 31, retain a direction position set therefor from the housing 8. The friction hinge 22, 23, 24, may normally retain the free end of the arm in alignment. However, on some occasions with the object close to the view line, it is a convenience to rock the non-use arm to clear the view line by swinging it on the friction hinge 22, 23, 24, to clear the field of illumination.

In lieu of the switch 55 and the slide terminals 47, 48, there may be in the area 49, terminals 57, 58, to be engaged by the contacts 50, 51 at the flashlight stop position for the housing 8 as to the base 9.

What is claimed and it is desired to secure by Letters Patent is:

1. An illumination device comprising a base, a first plate fixed with the base, a second plate, a pivotal connection providing a turntable mounting for the second plate on the first plate, a housing fixed with the second plate providing a chamber about the axis extended of said pivotal connection, a pair of one-to-one ratio transmission interconnected rockable members in the chamber between which members said axis extended is located, the axes of rocking of said members being in a common plane parallel to the turntable plane, an arm fixed with each member and laterally offset from said member axes, said arms extending from the housing and having an alignment relation parallel with the planes of the axes and turntable, said arms thru said transmission being simultaneously shiftable in movement from said alignment relation, light means, and an adjustable connection mounting a light means at the free end of each arm.

2. An illumination device comprising a base, a first insulation plate fixed with the base, a second insulation plate, a pivotal connection providing a turntable mounting for the second plate on the first plate, a housing fixed with the second plate providing a chamber about the axis extended of said pivotal connection, a pair of laterally adjacent interconnected rockable members in the chamber having said axis extended medially therebetween, an arm from each member offset from said member rocking axes and adapted to have an aligned position and coacting thru the member interconnection for simultaneous shifting therefrom, a light means carried by each arm, complementary electrical contact means in coacting relation between the plates, supply conductor means to the first plate contact means, and conductor means from the second plate contact means to the lights in the respective arms.

HALTEN W. HART.

REFERENCES CITED

The following references are of record in the file of this patent:

UNITED STATES PATENTS

| Number | Name | Date |
|---|---|---|
| 1,335,832 | Harvey | Apr. 6, 1920 |
| 1,520,738 | Yablin | Dec. 30, 1924 |
| 1,888,600 | Luder | Nov. 22, 1932 |
| 2,188,224 | Kathriner | Jan. 23, 1940 |
| 2,289,315 | MacKay | July 7, 1942 |
| 2,325,569 | Hancock et al. | July 27, 1943 |
| 2,443,357 | McMath et al. | June 15, 1948 |

FOREIGN PATENTS

| Number | Country | Date |
|---|---|---|
| 656,570 | Germany | Feb. 9, 1938 |